March 27, 1951 F. S. ELSAESSER 2,546,497
HAMBURG STEAK PATTY FORMING MACHINE
Filed Nov. 20, 1946 3 Sheets-Sheet 1
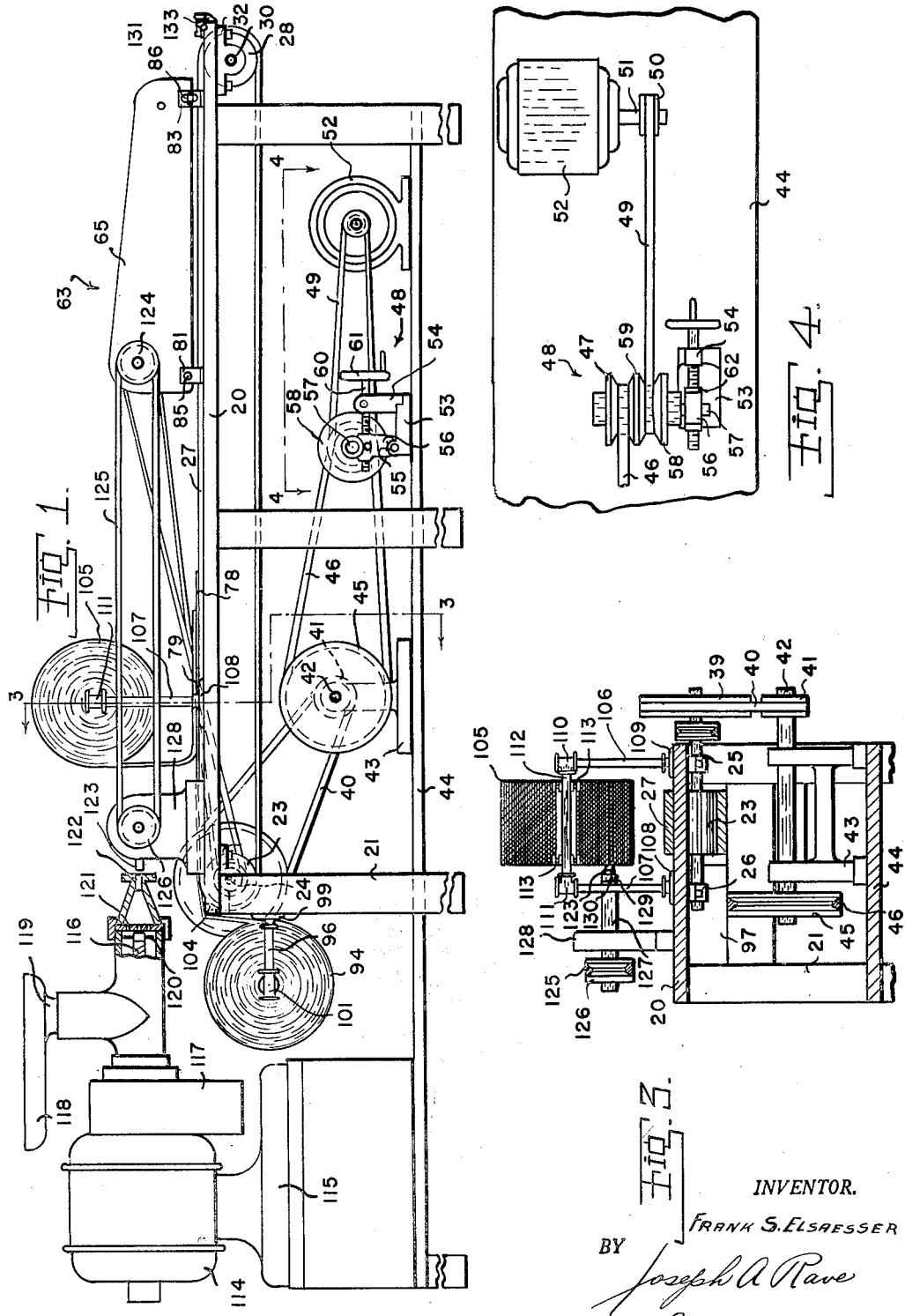
INVENTOR.
FRANK S. ELSAESSER
BY
Joseph A. Rave
ATTORNEY March 27, 1951  F. S. ELSAESSER  2,546,497
HAMBURG STEAK PATTY FORMING MACHINE
Filed Nov. 20, 1946  3 Sheets-Sheet 2
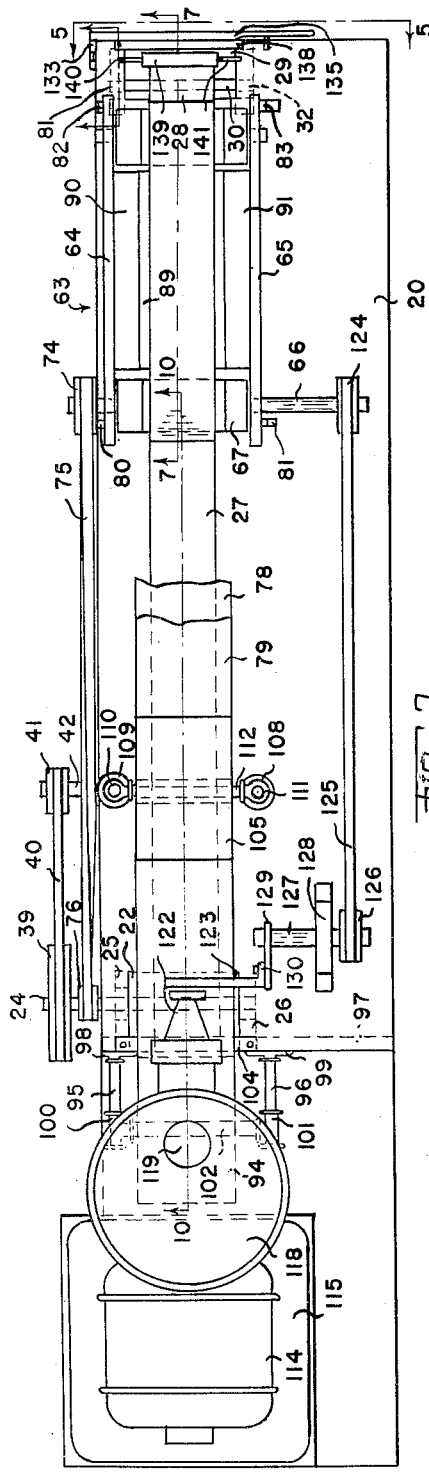
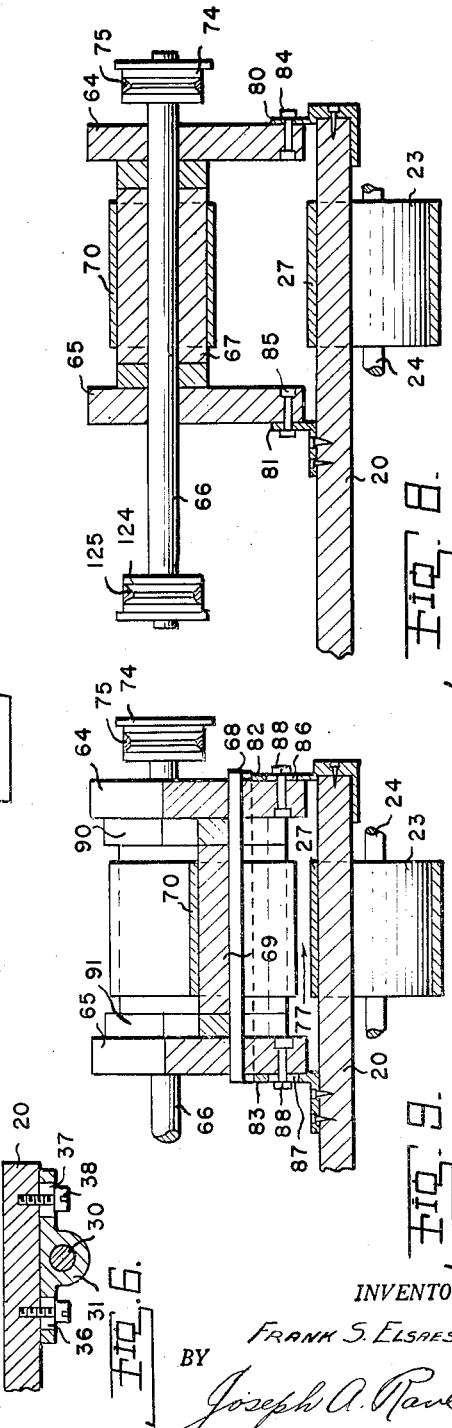
INVENTOR.
FRANK S. ELSAESSER
BY
Joseph A. Rave
ATTORNEY

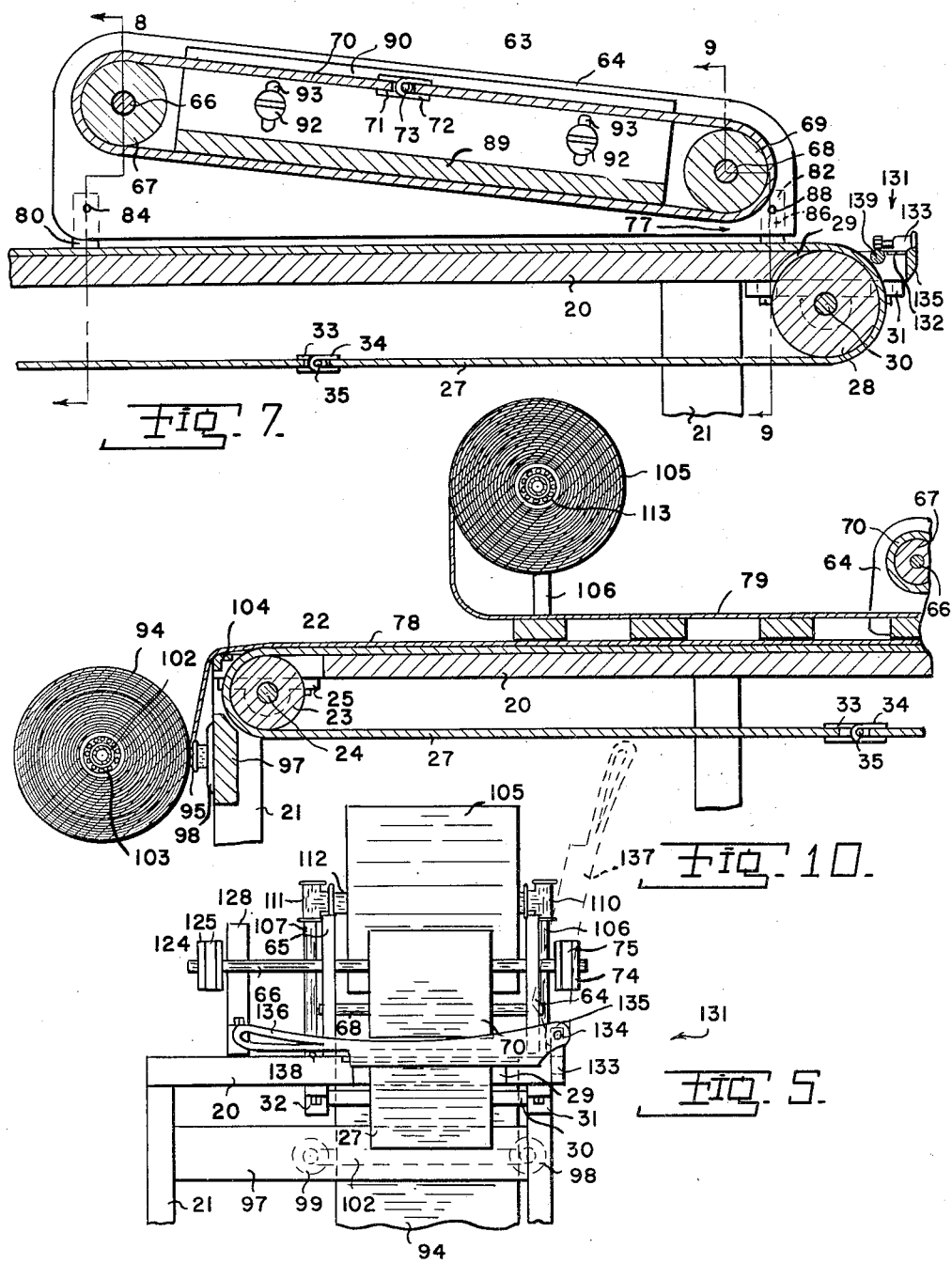

Patented Mar. 27, 1951

2,546,497

UNITED STATES PATENT OFFICE 2,546,497

HAMBURG STEAK PATTY FORMING MACHINE

Frank S. Elsaesser, Cincinnati, Ohio

Application November 20, 1946, Serial No. 711,083

12 Claims. (Cl. 17—32)

This invention relates to improvements in a Hamburg steak patty forming machine, and particularly to means for covering said Hamburg steak patty prior to and during the formation of said patty.

In the formation of a Hamburg steak patty it is necessary to provide the same with properly treated paper both above and below the said patty. In the past it has been customary to utilize an individual paper below and above the patty or to utilize a sheet of paper having sufficient length to underlie the patty and to be folded onto the upper surface of the patty. With either method of covering a Hamburg steak patty each single patty had to be separately or individually handled at the time of frying the same.

In restaurants and eating establishments specializing in Hamburg steak sandwiches, it frequently occurs that two or more orders for such a sandwich are simultaneously received or an individual order for two or more Hamburg steak sandwiches is received. In these instances considerable time is lost in handling the individual steak patties which require the removal of the top paper cover, placing the uncovered surface of the hamburg steak patty on the grill or skillet, and then removing the remaining paper from the Hamburg steak patty and then proceed with each Hamburg steak patty in a similar manner until the grill is filled or at least had the present orders taken care of. The grill utilized for frying Hamburg steak patties is of such dimension that three or more can generally be fried at the same time across one edge or side thereof and it is proposed by this application to provide a plurality of Hamburg steak patties each individually spaced from one another but covered with a single piece of paper, simultaneously, beneath all of the several Hamburg steak patties and a second piece of paper simultaneously covering all of said Hamburg steak patties, wherefore it is required to remove but a single piece of paper to expose all of the patties which are then placed on the grill and the remaining single piece of paper then removed.

It is, therefore, the principal object of the present invention to provide a Hamburg steak patty forming machine in which a plurality of Hamburg steak patties are simultaneously enclosed between prepared paper instead of having each Hamburg steak patty so arranged.

Another object of the present invention is the provision of a Hamburg steak patty forming machine for accomplishing the above object but which machine may be operated to supply individual Hamburg steak patties with a separate piece of prepared paper both beneath and above the said patties.

In the past it has also been customary to utilize mechanism for arranging the separate sheets of paper for each Hamburg steak patty and which mechanism had to be accurately timed with the rest of the machine and which mechanism was necessarily required to be accurately made.

A further object of this invention is, therefore, the provision of a Hamburg steak patty forming machine in which the cover paper is taken directly from rolls and therefore always in operative relation to the rest of the machine without any specific intricate timing or feeding mechanism.

A still further object of the present invention is the provision of a Hamburg steak patty forming machine which while highly efficient in operation is nevertheless economical to produce and acquire.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:

Fig. 1 is a side elevational view of a Hamburg steak patty forming machine embodying the improvements of this invention.

Fig. 2 is a top plan view of the machine illustrated in Fig. 1.

Fig. 3 is a vertical transverse sectional view through the machine as seen from line 3—3 on Fig. 1.

Fig. 4 is a fragmentary plan view of certain of the driving mechanism as seen from line 4—4 on Fig. 1.

Fig. 5 is an end elevation of the machine as illustrated in Figs. 1 and 2 as seen particularly from the right hand end of the machine on line 5—5 on said Fig. 2.

Fig. 6 is an enlarged fragmentary sectional view taken on line 6—6 on Fig. 2 and illustrating the mounting of a conveyor belt drum and forming a detail of the invention.

Fig. 7 is an enlarged fragmentary longitudinal sectional view through the masher mechanism as seen particularly from line 7—7 on Fig. 2.

Fig. 8 is a vertical sectional view, on an enlarged scale, through one end of the masher mechanism as seen from line 8—8 on Fig. 7.

Fig. 9 is a view similar to Fig. 8 taken through the other end of the masher mechanism on line 9—9 on Fig. 7.

Fig. 10 is an enlarged longitudinal sectional view through the head end of the machine illustrating, in particular, the mounting of the covering paper rolls and seen particularly from line 10—10 on Fig. 2, with certain parts not illustrated for the purpose of clearness.

Throughout the several views of the drawings, similar reference characters are employed to denote the same or similar parts.

The machine of this invention comprises a table member 20 supported in any suitable or desirable manner as by legs 21. Let into one end of the table 20 is a recess or opening 22 of a size to receive a drum or pulley 23. The pulley 23 is secured to a shaft 24 rotatably mounted in bearings 25 and 26, respectively, located one on each side of the opening 22. Partially encircling the pulley 23 is a belt 27 made of flexible material and adaptable to being washed or otherwise cleaned from time to time. The belt 27 is a conveyor belt for conveying the ground meat to and through a mashing unit or patty former, as will later be made clear.

The conveyor belt 27 partially encircles a second drum or pulley 28, located some distance from the pulley 23, for example as shown in the drawings, at the other end of the table 20, in a recess 29 provided in said table therefor. The pulley 28 is secured to a shaft 30 rotatably mounted in bearings 31 and 32 secured to the undersurface of the table, respectively, one on each side of the recess 29. The ends of the belt 27 are joined to one another to make it an endless conveyor and this joining may be accomplished in any suitable or desirable manner. As illustrated in the drawings, the joining is effected by providing each end of the belt with projecting metal loops 33 and 34, which interleaf to form a passageway through which a pin 35 passes. By this construction, the ends of the belt may be readily separated from one another by removing the pin 35 and the belt removed from the machine for washing or otherwise cleaning.

The bearings 31 and 32 are utilized to supply the belt 22 with the necessary tension and to take up any slack that may develop therein. To accomplish this the said bearings or bearing brackets 31 and 32 are each provided with elongated apertures 36 and 37 through which mounting bolts 38 pass and whereby the brackets with their shaft 30, may be adjusted toward and from the shaft 24, see Fig. 6.

The drum or pulley 23 is the driving pulley for the conveyor belt 27 and has its shaft 24 projecting beyond one side of the table 20 to have secured thereto a pulley 39 about which passes transmission belt 40. The transmission belt 40 also passes around pulley 41 secured to one end of intermediate shaft 42. The intermediate shaft 42 is rotatably mounted in a bracket 43 shown as secured to a shelf or the like 44 spaced below the table 20 and held in position by the legs 21. Secured to the other end of the intermediate shaft 42 is a pulley 45 having extending partially therearound a transmission belt 46. This transmission belt 46 also extends around a pulley 47 of a speed changing unit indicated in the drawings, in general, by the reference numeral 48. A further transmission belt 49 extends about a second pulley 58 of the speed changing unit 48 as well as about the driving pulley 50 on the free end of the shaft 51 of electric motor 52.

It should be noted that the motor pulley 50, intermediate shaft pulleys 41 and 45, change speed pulleys 47 and 58, and final driven or conveyor belt pulley 39 are of different diameters which is for the purpose of reducing the speed of rotation of drum pulley 23 from that of the motor 52 and that any other speed reducing transmission device may be arranged between the driving motor and said conveyor belt driving pulley or drum 23. It should further be noted that, some speed changing mechanism, such as that indicated above by the reference numeral 48, must be included in the transmission for a purpose which will later be made clear.

The speed reducing mechanism 48, per se, forms no part of the present invention except in combination and is of a type such as disclosed in United States Patents 2,151,189 and 2,186,477. Generally this speed reducing mechanism comprises a bracket 53 bolted or otherwise secured to the shelf 44 having upstanding from its opposite ends posts 54 and 55. Mounted in the post 55 for oscillatory movement is a carrier 56 rotatably supporting at its upper end a shaft 57. It is on the shaft 57 that the pulleys 47 and 58 are mounted. Said pulleys are respectively formed on opposite sides of a sliding pulley member 59, see Fig. 4, as fully explained in the patents above referred to. Briefly it is the relative position of the pulley member 59, axially of the shaft 57, that determines the effective diameter of the pulleys 47 and 58. This effective sizing of these pulleys 47 and 58 is brought about by the swinging of the carrier 56. In order to swing or oscillate carrier 56, the post 54 has journaled therein, against axial movement, a screw 60 carrying at its outer end a hand wheel 61 for effecting its rotation. The screw 60 is threaded through a nut 62 oscillatably carried by the carrier 56.

It is believed the operation of this speed changer or variable speed device is readily understood as an oscillation or movement of the carrier 56 away from the motor 52 will cause a tightening of transmission belt 49 and a corresponding loosening of transmission belt 46 whereby the intermediate pulley member 59 will shift away from the observer as seen in Figs. 1 and 4 causing a reduction in the diameter of the pulley 58 and an increase in the diameter of the pulley 47, while an oscillation or movement of the carrier 55 in the opposite direction will reversely shift the intermediate pulley member 59 and reversely effect the diameters of pulleys 58 and 47.

It will be noted that the conveyor belt driving pulley or drum 23 and the driven pulley or drum 28 are mounted to be tangent to the table top wherefore, the upper layer or reach of the conveyor belt moves along the said table top. Near the driven drum or pulley 28 the conveyor belt 27 passes beneath the mashing or flattening mechanism indicated in general by the reference numeral 63. This mashing or flattening mechanism gives the final shape or form, specifically thickness, to the Hamburg steak patty.

The mashing or flattening mechanism 63 comprises side members 64 and 65 spaced from one another a distance to permit the covering paper, later to be described in detail, to pass between them. Rotatably mounted in the side members 64 and 65, near their front ends and some distance above the conveyor belt 27, is a shaft 66 having secured to it a drum or pulley 67. The masher side members 64 and 65 near their rear ends also have rotatably mounted therein a shaft 68 which has secured to it a drum or pulley 69. It will be noted, particularly, from Fig. 7 that the shaft 68 is located much nearer the conveyor belt than shaft 66. Extending around the drums or pulleys 67 and 69 is a belt 70, made endless by joining the ends thereof to one another through the usual belt lacing comprising metal loops 71 and 72 extending respectively from each end of the belt 70 toward the other and interleaved to form a passageway through which a connecting pin 73 passes. By this construction the said belt 70 may be removed from the masher mechanism for cleaning and for replacement purposes as was above described with reference to the conveyor belt 27.

The drum or pulley 67 is the driving pulley while the drum or pulley 69 is the driven or idler pulley for which reason the shaft 66 of drum 67 extends beyond one of the masher sides, preferably the far side, as seen in Fig. 5, to have secured to it a pulley 74 partially encircled by a transmission belt 75. The transmission belt 75 also partially encircles a second pulley 76 on the shaft 24 of the conveyor belt driving drum 23. The transmission belt pulleys 74 and 76 are of such diameter that the belts 27 and 70 have substantially the same surface rate of travel. As will be seen in Fig. 7, the upper layer or reach of conveyor belt 27 is directly below and opposed to the bottom layer or reach of masher belt 70. These belt layers or reaches are to travel in the same direction, that is, from left to right, as seen in the drawings, wherefore, the transmission belt 75 is twisted, as seen in Figs. 1 and 2, causing the shaft 67 to rotate counter-clockwise while the shaft 24 is driven to rotate clockwise.

As noted above and can be seen from Fig. 7, the shaft 66 is a greater distance from belt 27 than the shaft 68 thereby providing a contracting throat which constitutes the masher or flattening chamber with the final thickness or thinness of the Hamburg steak patty, determined by the space between belts 27 and 70 at the point where the belt 70 passes around the lowest point of the drum or pulley 69 and this point is indicated in the drawings by the reference character 77.

The operation of the masher mechanism 63 is as follows:

The conveyor belt 27 carries a quantity of ground meat on paper layer 78 and which ground meat is covered by a paper layer 79 into the large end of the mashing or flattening chamber and the ground meat is engaged on its upper side by the belt 70, which being driven assists in moving the said meat through the chamber. Since the said belts 27 and 70 gradually converge toward one another, the meat is likewise reduced in thickness until the narrowest point 77 of the chamber is reached whereupon the driven or idler drum 69 completes the flattening of the ground meat into a patty ready for cooking or frying. The original quantity of ground meat that entered the flattening chamber was the right amount to produce the desired Hamburg steak.

The masher mechanism 63 is secured in place by a pair of brackets 80 and 81, respectively, connecting the front ends of side members 64 and 65 to the table top 20 and by brackets 82 and 83 which, respectively, secure the rear ends of said side member to the table top. The front brackets are permanently secured to the table and have a pivotal connection at 84 and 85 with their respective side members, while the brackets 82 and 83 are likewise permanently secured to the table but they have an adjustable connection at 86 and 87 with their respective side members. This adjustable connection consisting of a slot in each bracket 82 and 83 through each of which passes a clamp bolt 88. From this it will be seen that the exit throat 77 of the masher chamber may be varied in thickness by adjusting the masher mechanism about the pivots 84 and 85 to raise or lower the drum or pulley 69 relative to the conveyor belt 27.

In order to effect the mashing or flattening of the meat as it passes through the masher chamber, the lower portion or reach of the belt 70 is backed up by a pressure board or buckboard 89. The pressure board 89 may be mounted in position through wings 90 and 91 respectively, projecting from the sides thereof and having passing therethrough, into the masher side members 64 and 65, bolts 92. By providing the pressure board wings 90 and 91 with elongated apertures 93 for the bolts 92 the pressure board 89 may be adjusted toward and from the conveyor belt 27.

The paper layer 78 is unreeled from a roll 94 located adjacent the head end of the machine. Any suitable or desirable means may be employed for mounting the roll 94, such for example as shown in Figs. 1 and 2, consisting of arms 95 and 96 respectively secured to table brace or cross member 97 through flanges 98 and 99 at the ends of said arms 95 and 96. Each of said arms 95 and 96 at its other ends is provided with a bearing member 100 and 101 in which is mounted a shaft 102 acting as an axle for the paper roll 94.

The paper roll 94 must be mounted for free rotation wherefore it has pressed into its opposite sides anti-friction or ball bearings, one of which is illustrated in Fig. 10 and indicated by the reference numeral 103. The paper or paper layer 78 passes upwardly from the roll 94 over the forward edge of the table 20 and preferably over a guide member 104 carried by the table 20 and spanning the recess 22 therein. The guide 104 may conveniently take the form of an angle-iron through the horizontal leg of which passes suitable screws or other fastening means as illustrated clearly in Fig. 2.

The paper 78 is of sufficient width to completely underlie the Hamburg steak patty after it has been flattened as above pointed out. The paper layer 78 after passing over the guide 104 is disposed on the conveyor belt 27 to move in unison with the said conveyor belt. This unitary movement of the conveyor belt 27 and paper layer 78 is assisted by the ground meat pressing the said paper 78 against the conveyor belt 27.

The paper layer 79, similar to the paper layer 78, is unreeled during the operation of the machine from a roll 105 which is mounted on the table 20 to be above the conveyor belt 27. Any suitable or desirable means may be employed for mounting the paper roll 105, that shown in the drawings being similar to the mounting of the paper roll 94. This mounting of the paper roll 105 comprises arms 106 and 107 having their lower ends secured through flanges 108 and 109 to the table top 20 with one of said flanges on opposite sides of the conveyor belt 27. The arms 106 and 107 at their upper ends are provided with bearings 110 and 111 for a shaft or spindle 112. The paper roll 105 similar to the paper roll 94 must be mounted for free rotation wherefore it has pressed into the opposite ends of its central passage an anti-friction bearing 113 as illustrated in Fig. 3.

The paper layer 79 is of substantially the width as the paper layer 78 and depends from the roll 105 to overlie the quantity of ground meat to be subsequently mashed or flattened into a patty. As is well known Hamburg steak has a certain amount of moisture content causing the same to be relatively sticky and this property is taken advantage of in causing the paper layer 78 to follow the ground meat prior to the flattening or mashing thereof. It will be appreciated that after the paper layer 79 is started on its path of movement with the ground meat quantity it continues to be unreeled from the roll 105 and moves in unison with the conveyor belt 27 and paper layer 78 thereon.

The quantity of meat to be formed into a patty is cut from a stream delivered from a meat grinder and which meat grinder as illustrated in Figs. 1 and 2 is positioned to have its outlet in operative relation to the head end of the machine and overlie the paper layer 78 just behind the paper guide 104. In other words the discharge of the meat grinder is onto the paper layer 78 at a point ahead of the paper roll 105 so that the paper layer 79 may be positioned on the ground meat after it is severed from the stream. It should be noted, there is nothing new or novel in the meat grinder, per se, except as to its support in relation to the patty conveying and forming portions of the machine.

The meat grinder as disclosed in the drawings comprises a motor 114 secured to or mounted on a base 115 for driving a feed worm 116. The worm 116 is driven from the motor 114 through a speed reducing mechanism in a housing 117. The meat to be ground is disposed on a tray 118 mounted above a funnel feed 119 to the worm 116. The worm 116 forces the meat past a cutter 120 at the end of the worm and through the shredding plate 121. The shredded or ground and severed meat particles pass through a nozzle 122 to be extruded from the grinder.

Operating in front of the nozzle 122 is a knife 123 which periodically severs the extruded meat from that still within the grinder. The knife 123 is timed to operate periodically, that is, after a predetermined and desired amount of ground meat has been extruded from the nozzle 122. The knife 123 may be actuated in any suitable or desirable manner such as by reciprocating past the nozzle as disclosed in the above identified application or by rotating relative thereto as disclosed in the said application and as shown herein; in each case, as the knife passes the nozzle opening a quantity of meat is deposited on the paper layer 78 and conveyor belt 27 for subjection to the masher mechanism.

The means for rotating the knife 123, as shown herein, comprises securing a pulley 124 to the masher driving shaft 66 about which is trained a transmission belt 125 in turn trained about a pulley 126 on the end of knife shaft 127. The shaft 127 is rotatably journaled in a suitable bearing 128 secured to and upstanding from the table 20. The inner end of the knife shaft 127 has secured to it an arm 129 to which is secured a flange 130 integral with and projecting from the knife 123.

It is believed obvious that rotation of the knife shaft 127 causes the knife 123, during each revolution, to sever a quantity of meat from the stream being constantly extruded from the nozzle 122.

Hamburg steaks vary in weight and their size are generally determined by the number thereof formed from a pound of ground Hamburg steak meat. Since the knife 123 is operated from a source of power independent of the source of power for the meat grinding machine and, as noted above, the latter constantly produces ground meat, it is necessary to actuate the knife at shorter intervals if smaller or less expensive Hamburg steaks are desired then if larger ones are required. It is for this reason that there is included in the conveyor belt transmission mechanism the speed changing device 48. From this it will be seen that since the cutoff knife operating mechanism, flattening or mashing mechanism and conveyor belt are all operated from the same source their speed and rate operation can be correlated or adjusted to the constant speed of the grinding motor for producing the desired results, either the quantity of Hamburg steaks per unit of time, or the quantity of Hamburg steaks per unit of ground meat delivered from the meat grinder.

As will be seen from Fig. 10 the quantities of ground meat to be formed into patties are fed in a constant stream through the flattening or mashing device with a paper layer 78 beneath the same and a second paper layer 79 thereabove. The patties may be left in this continuous stream but are preferably separated from one another either in single units, that is, one patty between covering paper, or a plurality of patties having a continuous covering paper, that is, two, three or more patties to a unit, each unit covered by a continuous piece of paper above the same and a second continuous piece of paper below the same. In order to do this a paper cutoff mechanism is mounted at the rear or tail end of the machine and which paper cutoff mechanism is indicated in general in the drawings by the reference numeral 131.

The paper cutoff mechanism 131 comprises a fixed blade 132 secured to the table 20 and preferably spanning the recess 29 therein. Secured to the longitudinal edge of the table 20 preferably at the back corner thereof is a bracket 133 providing a pivot 134 for a movable or oscillatable knife blade 135. The knife blade 135 is provided at its end remote from the pivot 134, with a handle 136 through which the said blade is oscillated from its vertical or inoperative position, shown in phantom lines 137 in Fig. 5 to its operative position shown in solid lines in said Fig. 5. It will be noted that the knife blade is adapted to completely traverse the cooperating edge of the fixed blade 132 and to finally determine this position the table 20 has projecting therefrom a stop 138 for engagement by the knife blade handle 136.

It is believed the operation of this mechanism is obvious since the Hamburg steak patties pass from the flattening or mashing mechanism throat in a continuous stream and the operator merely actuates the knife 135 after the desired number of patties has passed thereunder. In other words, the operator may sever each individual Hamburg steak patty or may sever after each pair of patties have passed the knife or after each group of three or more patties have passed the knife depending upon their ultimate use either singularly or in groups of two or more. From this it will be seen that Hamburg steak patties may be supplied to the restaurants' or other eating establishments' kitchens in the desired quantities or banks so that they may be fried or otherwise prepared singularly or in groups as desired.

It will be appreciated that since the patties with their paper layer above and below are constantly passing from the end of the machine the knife would have a tendency to momentarily interrupt this movement and since the knife mechanism is necessarily beyond the end of the conveyor belt 27 the interruption to this continuous flow may case a slight buckling of the paper layer 78 and 79 between the patty beyond the conveyor belt and the patty still on said conveyor belt. To overcome this the table 20 is provided behind the knife mechanism fixed blade 132 with a freely rotatable roller 139 which is provided from its opposite ends with an axle or spindle 140 and 141 rotatably received in suitable sockets in the table at diametrically opposite points across the table recess 29. This roller, being freely rotatable, enables the stream of Hamburg steak patties and covering paper layers 78 and 79 to continue their movement as soon as the knife blade 135 is raised from its cutoff position and which raising of the knife blade occurs immediately after the severing operation is completed.

From the foregoing it will now be appreciated that there has been provided a Hamburg steak patty forming machine which accomplishes the objects initially set forth.

It will further be noted that Hamburg steak patties are produced expeditiously and in a sanitary manner, and it will further be noted that the mechanism and parts of the machine are at all times protected from inadvertent contact with ground meat as occasionally occurred with the machine disclosed in the application hereinabove set forth.

What is claimed is:

1. In a device of the class described the combination with a meat grinder having an outlet through which issues a continuous stream of ground meat, of a supporting table, a continuously moving conveyor belt on said table beneath the grinder outlet, a patty forming means on said table in operative relation to the conveyor belt, a continuous underlying paper layer over the conveyor belt for movement therewith, said paper layer being adapted to receive successive quantities of meat from the grinder for transporting the same to the patty forming means, and means for cutting off said successive quantities of meat from the stream of ground meat being extruded from the meat grinder.

2. In a device of the class described the combination with a meat grinder having an outlet through which issues a continuous stream of ground meat, of a supporting table, a continuously moving conveyor belt on said table beneath the grinder outlet, a patty forming means on said table in operative relation to the conveyor belt, a continuous underlying paper layer over the conveyor belt for movement therewith, said paper layer being adapted to receive successive quantities of meat from the grinder for transporting the same to the patty forming means, means for cutting off said succesive quantities of meat from the stream of ground meat being extruded from the meat grinder, said continuous underlying paper being obtained from a roll thereof, and means for mounting said paper roll relative to the table for unreeling the same by and onto the conveyor belt.

3. In a device of the class described the combination with a meat grinder having an outlet through which issues a continuous stream of ground meat, of a supporting table, a continuously moving conveyor belt on said table beneath the grinder outlet, a patty forming means on said table in operative relation to the conveyor belt, a continuous underlying paper layer over the conveyor belt for movement therewith, said paper layer being adapted to receive successive quantities of meat from the grinder for transporting the same to the patty forming means, means for cutting off said successive quantities of meat from the stream of ground meat being extruded from the meat grinder, and a continuous covering layer of paper above said quantities of meat and applied thereto prior to the patty formation thereof.

4. In a device of the class described the combination with a meat grinder having an outlet through which issues a continuous stream of ground meat, of a supporting table, a continuously moving conveyor belt on said table beneath the grinder outlet, a patty forming means on said table in operative relation to the conveyor belt, a continuous underlying paper layer over the conveyor belt for movement therewith, said paper layer being adapted to receive successive quantities of meat from the grinder for transporting the same to the patty forming means, means for cutting off said successive quantities of meat from the stream of ground meat being extruded from the meat grinder, and means located beyond said patty forming means for severing said underlying paper layer at points intermediate the formed patties.

5. In a device of the class described the combination with a meat grinder having an outlet through which issues a continuous stream of ground meat, of a supporting table, a continuously moving conveyor belt on said table beneath the grinder outlet, a patty forming means on said table in operative relation to the conveyor belt, a continuous underlying paper layer over the conveyor belt for movement therewith, said paper layer being adapted to receive successive quantities of meat from the grinder for transporting the same to the patty forming means, means for cutting off said successive quantities of meat from the stream of ground meat being extruded from the meat grinder, a continuous covering layer of paper above said quantities of meat and applied thereto prior to the patty formation thereof, said covering paper layer being obtained from a roll thereof, and means for mounting said paper covering roll above the table at a point between the meat grinder outlet and patty forming means.

6. In a device of the class described the combination with a meat grinder having an outlet through which issues a continuous stream of ground meat, of a supporting table, a continuously moving conveyor belt on said table beneath the grinder outlet, a patty forming means on said table in operative relation to the conveyor belt, a continuous underlying paper layer over the conveyor belt for movement therewith, said paper layer being adapted to receive successive quantities of meat from the grinder for transporting the same to the patty forming means, means for cutting off said successive quantities of meat from the stream of ground meat being extruded from the meat grinder, a continuous covering layer of paper above said quantities of meat and applied thereto prior to the patty formation thereof, said covering paper layer being obtained from a roll thereof, means for mounting said paper covering roll above the table at a point between the meat grinder outlet and patty forming means, and means located beyond said patty forming means for severing said underlying and covering paper layers at points intermediate the formed patties.

7. In a device of the class described the combination with a meat grinder having an outlet through which issues a continuous stream of ground meat, of a supporting table, a continuously moving conveyor belt on said table beneath the grinder outlet, a patty forming means on said table in operative relation to the conveyor belt, a continuous underlying paper layer over the conveyor belt for movement therewith, said paper layer being adapted to receive successive quantities of meat from the grinder for transporting the same to the patty forming means, means for cutting off said successive quantities of meat from the stream of ground meat being extruded from the meat grinder, said continuous underlying paper being obtained from a roll thereof, means for mounting said paper roll relative to the table for unreeling the same by and onto the conveyor belt, a continuous covering layer of paper above said quantity of meat and applied thereto prior to the patty formation thereof, said covering paper layer being obtained from a roll thereof, means for mounting said covering paper roll above the table at a point between the meat grinder outlet and patty forming means, and means located beyond said patty forming means for severing said underlying and covering paper layers at points intermediate the formed patties.

8. In a device of the class described the combination with a meat grinder having an outlet through which issues a continuous stream of ground meat, of a supporting table, a continuously moving conveyor belt on said table beneath the grinder outlet, a patty forming means on said table in operative relation to the conveyor belt, a continuous underlying paper layer over the conveyor belt for movement therewith, said paper layer being adapted to receive successive quantities of meat from the grinder for transporting the same to the patty forming means, and means for cutting off said successive quantities of meat from the stream of ground meat being extruded from the meat grinder, comprising a knife movable intermittently past the grinder outlet in timed relation to the rate of continuous discharge from the outlet.

9. In a device of the class described the combination with a meat grinder having an outlet through which issues a continuous stream of ground meat, of a supporting table, a continuously moving conveyor belt on said table beneath the grinder outlet, a patty forming means on said table in operative relation to the conveyor belt, a continuous underlying paper layer over the conveyor belt for movement therewith, said paper layer being adapted to receive successive quantities of meat from the grinder for transporting the same to the patty forming means, and means for cutting off said successive quantities of meat from the stream of ground meat being extruded from the meat grinder, comprising a knife mounted for rotation to pass the grinder outlet in time relation to the rate of continuous discharge from the outlet.

10. In a device of the class described the combination with a meat grinder having an outlet through which issues a continuous stream of ground meat, of a supporting table, a continuously moving conveyor belt on said table beneath the grinder outlet, a patty forming means on said table in operative relation to the conveyor belt, a continuous underlying paper layer over the conveyor belt for movement therewith, said paper layer being adapted to receive successive quantities of meat from the grinder for transporting the same to the patty forming means, means for cutting off said successive quantities of meat from the stream of ground meat being extruded from the meat grinder, and means located beyond said patty forming means for severing said underlying paper layer at points intermediate the formed patties, comprising an oscillatable knife blade carried by the table adjacent the end thereof beyond the conveyor belt.

11. In a device of the class described the combination with a meat grinder having an outlet through which issues a continuous stream of ground meat, of a supporting table, a continuously moving conveyor belt on said table beneath the grinder outlet, a patty forming means on said table in operative relation to the conveyor belt, a continuous underlying paper layer over the conveyor belt for movement therewith, said paper layer being adapted to receive successive quantities of meat from the grinder for transporting the same to the patty forming means, means for cutting off said successive quantities of meat from the stream of ground meat being extruded from the meat grinder, and means located beyond said patty forming means for severing said underlying paper layer at points intermediate the formed patties, comprising an oscillatable knife blade carried by the table adjacent the end thereof beyond the conveyor belt, and a fixed knife blade on the supporting table relative to which the oscillatable knife blade passes.

12. In a device of the class described the combination with a meat grinder having an outlet through which issues a continuous stream of ground meat, of a supporting table, a continuously moving conveyor belt on said table beneath the grinder outlet, a patty forming means on said table in operative relation to the conveyor belt, a continuous underlying paper layer over the conveyor belt for movement therewith, said paper layer being adapted to receive successive quantities of meat from the grinder for transporting the same to the patty forming means, means for cutting off said successive quantities of meat from the stream of ground meat being extruded from the meat grinder, a continuous covering layer of paper above said quantities of meat and applied thereto prior to the patty formation thereof, means located beyond said patty forming means and conveyor belt for severing said underlying and covering paper layers at points intermediate the formed patties, comprising a fixed knife blade at the end of the supporting table beyond the conveyor belt and an oscillatable knife blade carried by the table in operative relation to the fixed knife blade for oscillation relative to one another, and anti-friction means for supporting said underlying and covering paper layers with the patties therebetween, between the conveyor belt and paper severing means.

FRANK S. ELSAESSER.

REFERENCES CITED

The following references are of record in the file of this patent:

UNITED STATES PATENTS

| Number | Name | Date |
|---|---|---|
| 2,070,850 | Trabold | Feb. 16, 1937 |
| 2,299,314 | Elesh et al. | Oct. 20, 1942 |
| 2,386,775 | Balzarini | Oct. 16, 1945 |

FOREIGN PATENTS

| Number | Country | Date |
|---|---|---|
| 7,009 | Norway | Feb. 6, 1899 |
| 36,792 | France | Apr. 29, 1930 |